United States Patent [19]

Hirano

[11] Patent Number: 4,793,420

[45] Date of Patent: Dec. 27, 1988

[54] CONTROLLED PRODUCT FEEDING DEVICE FOR COMBINATION WEIGHING MACHINE

[75] Inventor: Takashi Hirano, Kobe, Japan

[73] Assignee: Yamato Scale Company, Limited, Japan

[21] Appl. No.: 72,856

[22] Filed: Jul. 14, 1987

[30] Foreign Application Priority Data

Jul. 14, 1986 [JP] Japan .................. 61-166372

[51] Int. Cl.⁴ .................. G01G 13/00; G01G 19/52
[52] U.S. Cl. .................. 177/25; 177/50
[58] Field of Search .................. 177/25.18, 50

[56] References Cited

U.S. PATENT DOCUMENTS

| | | |
|---|---|---|
| 4,397,364 | 8/1983 | Hirano . |
| 4,484,645 | 11/1984 | Inoue .................. 177/25.18 |
| 4,508,186 | 4/1985 | Sashiki et al. .................. 177/26.18 X |
| 4,553,616 | 11/1985 | Haze .................. 177/26.18 X |
| 4,658,919 | 4/1987 | Nobutsugu .................. 177/25.18 X |
| 4,664,200 | 5/1987 | Mikami et al. .................. 177/25.18 |
| 4,694,920 | 9/1987 | Naito et al. .................. 177/50 X |

Primary Examiner—George H. Miller, Jr.
Attorney, Agent, or Firm—Senniger, Powers, Leavitt and Roedel

[57] ABSTRACT

In a combination weighing machine comprising a plurality of weighing units and a plurality of product feeders for feeding product to the respective weighing units, a device for controlling the amount of product fed to each weighing unit based upon the deviation of the weight data from each weighing unit from a predetermined target weight for each feeder. The amounts of product fed to respective weighing units can be controlled independently.

42 Claims, 3 Drawing Sheets

CONTROLLED PRODUCT FEEDING DEVICE FOR COMBINATION WEIGHING MACHINE

BACKGROUND OF INVENTION

This invention relates generally to a combination weighing machine and particularly to automatic control of the amount of product fed to each weigher of such a machine.

As well known in the art, a combination weighing machine includes a plurality of weighers for respectively weighing quantities of product and combines the weight values from respective weighers in various fashion to select from the resultant combinations a combination having a total weight satisfying a predetermined condition. It has been known in employing this machine that maximum accuracy of the total weight with respect to the predetermined condition is obtained when the selected combination is composed of the weight values from half of the number of the available weighers. In order to use half of number of weighers, for each weighment, means has been proposed for automatically controlling the amount of product fed to each weigher. For example, U.S. Pat. No. 4,397,364 discloses a device for controlling the amount of feed based upon the detected number of weighers included in each selected combination. U.S. Pat. No. 4,484,645 discloses a device for controlling this amount based upon the detected mean weight from those weighers not included in the selected combination. In these prior art devices, the amounts of feed to all weighers are controlled in a batch based upon a common control data.

However, it has been found that such batch control can not provide intended accuracy due to unavoidable variance in feeding operations of product feeders associated with respective weighers. More particularly, a conventional combination weighing machine includes a product feeding system consisting of a central dispersion table and a plurality of linear feeding troughs radially arranged around the dispersion table. These feeding troughs are subjected to mechanical vibration to convey product to respective weighers at their distal or outer ends. While the amount of feed is controlled by controlling the vibration amplitude, it is difficult to obtain uniform control of amplitude in all feeding troughs. The variance in feeding rate is also caused by difference in surface friction of respective troughs.

SUMMARY OF INVENTION

Accordingly, an object of this invention is to provide an improved product feeding device which enables independent control of the amount of product fed to each weigher based upon control data which is exclusively provided for said weigher, thereby removing the above-mentioned disadvantage caused by the prior art batch control.

According to a feature of this invention, there is provided a product feeding device including a plurality of separate feeders associated with respective weighers. Means is provided for individually controlling the amount of product fed from each feeder to the corresponding weigher based upon a control data which is exclusively provided for said weigher. Each weigher is previously provided with an inherent target weight of product to be fed thereto. The control data is prepared based upon the deviation of the selected weight value indicated by said weigher as compared to its target weight.

According to another feature of this invention, the device further includes a common feeder for distributively feeding product to the separate feeders. Means is provided for controlling the amount of product fed from the common feeder to the separate feeders based upon a control data. The control data is prepared based upon the total weight of product fed to the respective weighers and the sum of the regulated target weights of the respective weighers.

These and other objects and features of this invention will be described in detail below with reference to the accompanying drawings.

DESCRIPTION OF PREFERRED EMBODIMENTS

Figure 1:
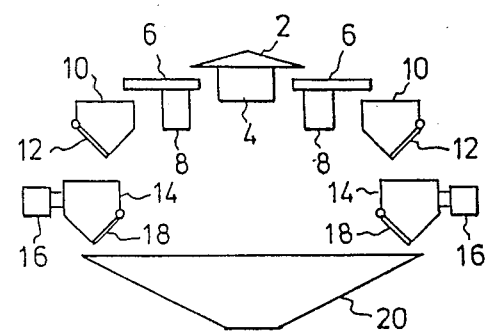
FIG. 1 is a schematic side view representation of a mechanical configuration of a typical combination weighing machine in which this invention may be employed.

Referring first to FIG. 1, there is shown an exemplary combination weighing machine including a product feeding device consisting of a conical dispersion table 2 provided with an electromagnetic vibrator 4 and a plurality of linear feeding troughs 6 provided with an electromagnetic vibrator 8 each and arranged radially around the table 2. The dispersion table 2 is subjected to helical vibration to disperse product fed to its apex toward its periphery. The feeding troughs 6 are individually subjected to linear slanting vibration to convey the product received from the dispersion table 2 to their distal or outer ends. A separate pool hopper 10 is disposed under each distal end of each trough 6 to receive the product from the troughs 6 and temporarily hold the product. In accordance with this invention, the vibration amplitude and/or the time of the vibrators 8 is separately controlled to adjust the amount of product fed to the respective pool hoppers 10. Each pool hopper 10 has a discharge gate 12 at its bottom. A weigh hopper 14 is disposed thereunder for receiving the product from the pool hopper 10 when the gate 12 opens. Each weigh hopper 14 is associated with a weight sensor 16 such as a load cell for providing an electric signal indicative of the weight of product in the weigh hopper 14. Each weigh hopper 14 also has a discharge gate 18 for discharging the contents of hopper 14 when gate 18 is opened, and a common collection chute 20 is disposed thereunder for collecting the product discharged from the weigh hoppers 14. While any number "n" of weigh hoppers (and corresponding pool hoppers 10 and feeding troughs 6) may be included in the machine, only two facing ones are shown in the drawing for simplicity.

Figure 2:
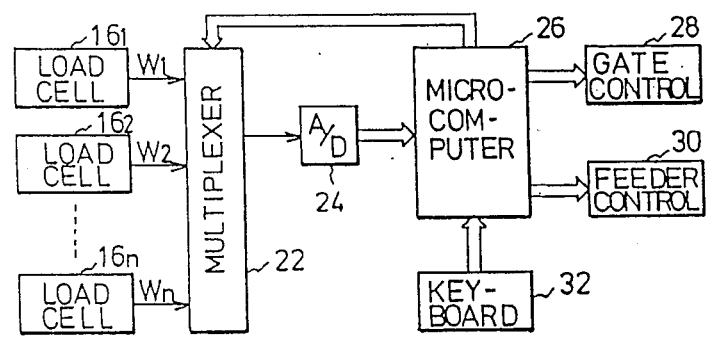
FIG. 2 is a block diagram representing an electrical configuration of the combination weighing machine of FIG. 1.

As shown in FIG. 2, the weight sensing load cells $16_1$, $16_2$, ... $16_n$ are coupled through a multiplexer 22 and an analog-to-digital (A/D) convertor 24 to a microcomputer 26. The multiplexer 22 is controlled by the microcomputer 26 to sequentially supply the weight data signals $W_1$, $W_2$, ... $W_n$ in time division fashion to the A/D converter 24. The analog weight data signal is converted by convertor 24 in digital form and stored in a random access memory (RAM) of the microcomputer 26. As well known in the art, the microcomputer 26 combines the stored weight data in various fashions and calculates the total weights of the resultant combinations. The microcomputer 26 then selects from these combinations a combination whose total weight is equal or nearest to a predetermined reference weight and commands a gate control device 28 to open the discharge gates 18 of the weigh hoppers 14 whose weight data are included in the selected combination. The gate control device 28 then opens the discharge gates 12 of the corresponding pool hoppers 10 to reflesh the emptied weigh hoppers 14. No further description will be made on this combination selection operation since it constitute no part of this invention.

The microcomputer 26 also calculates feeder control data consisting of amplitude specifying data $A_1$, $A_2$, ... $A_n$ and $A_0$ and time specifying data $T_1$, $T_2$, ... $T_n$ and $T_0$ from the weight data $W_1$, $W_2$, ... $W_n$ and corresponding target weight data $WT_1$, $WT_2$, ... $WT_n$ as described later and supplies the data in digital form to a feeder control device 30. The feeder control device 30 responds to this control data to independently control the vibration amplitude and/or operating time of the vibrators 4 and 8. A keyboard unit 32 is provided for writing initial data such as reference and target weights in the RAM of the microcomputer 26.

Figure 3:
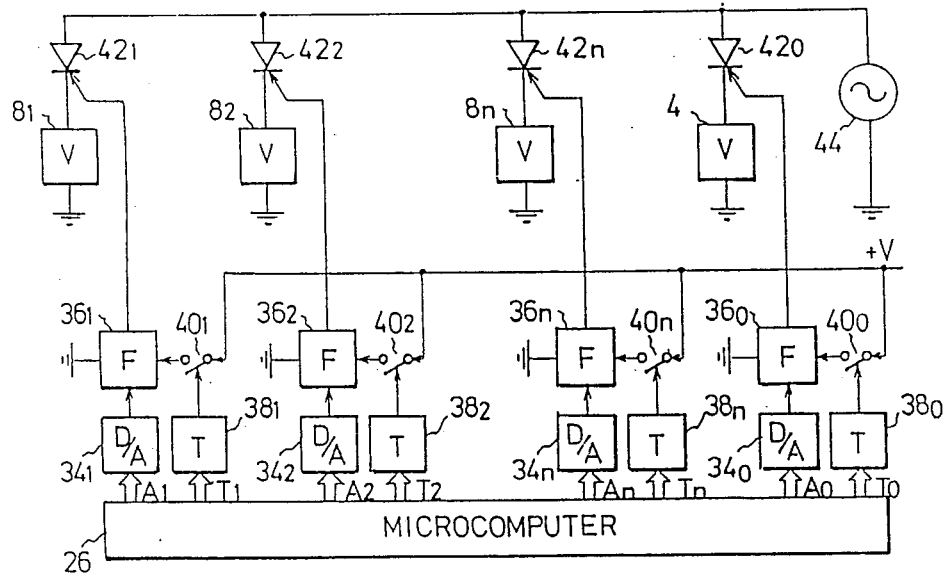
FIG. 3 is a schematic circuit diagram representing an exemplary configuration of the feeder control device of FIG. 2 according to the invention.

Referring to FIG. 3 which shows an embodiment of the feeder control device 30, the above-mentioned amplitude specifying data $A_i$ ($i=0, 1, 2, ... n$) are supplied through digital-to-analog (D/A) convertors $34_i$ to firing circuits $36_i$. The time specifying data $T_i$ are supplied to timing circuits $38_i$ which provide timing pulses having pulse widths respectively corresponding to the input data $T_i$ to the control terminals of normally-open switches $40_i$ which respectively apply d.c. operation voltage $+V$ to the firing circuits $36_i$ when closed. The timing circuits $38_i$ may consist of a programmable down-counter set by the digital time specifying data and an OR circuit having inputs connected to respective stages of the down-counter. As the down-counter provides logic "1" output from at least one of its stages until the count reaches decimal zero, the OR circuit provides a continuous output corresponding to the data $T_i$. It will be easy for those skilled in the art to design other suitable circuits. The firing circuits $36_i$ have their outputs connected respectively to the gate electrodes of thyristors $42_i$ inserted between an a.c. supply 44 and the vibrators 4 and $8_i$, and function to change the firing angles of the thyristors. Each of the firing circuits $36_i$ may be a known phase control circuit including bipolar and uni-junction transistors, a capacitor and resistors, which provides a variable-phase output by controlling the conductivity of the bipolar transistor by the input amplitude specifying data $A_i$ to control the conduction timing of the uni-junction transistor with the RC-circuit. The a.c. driving power applied to each vibrator varies with the firing angle of each thyristor. Accordingly, each vibrator tends to cause vibration at an amplitude specified by the data $A_i$ for a time specified by the data $T_i$.

Figure 4:
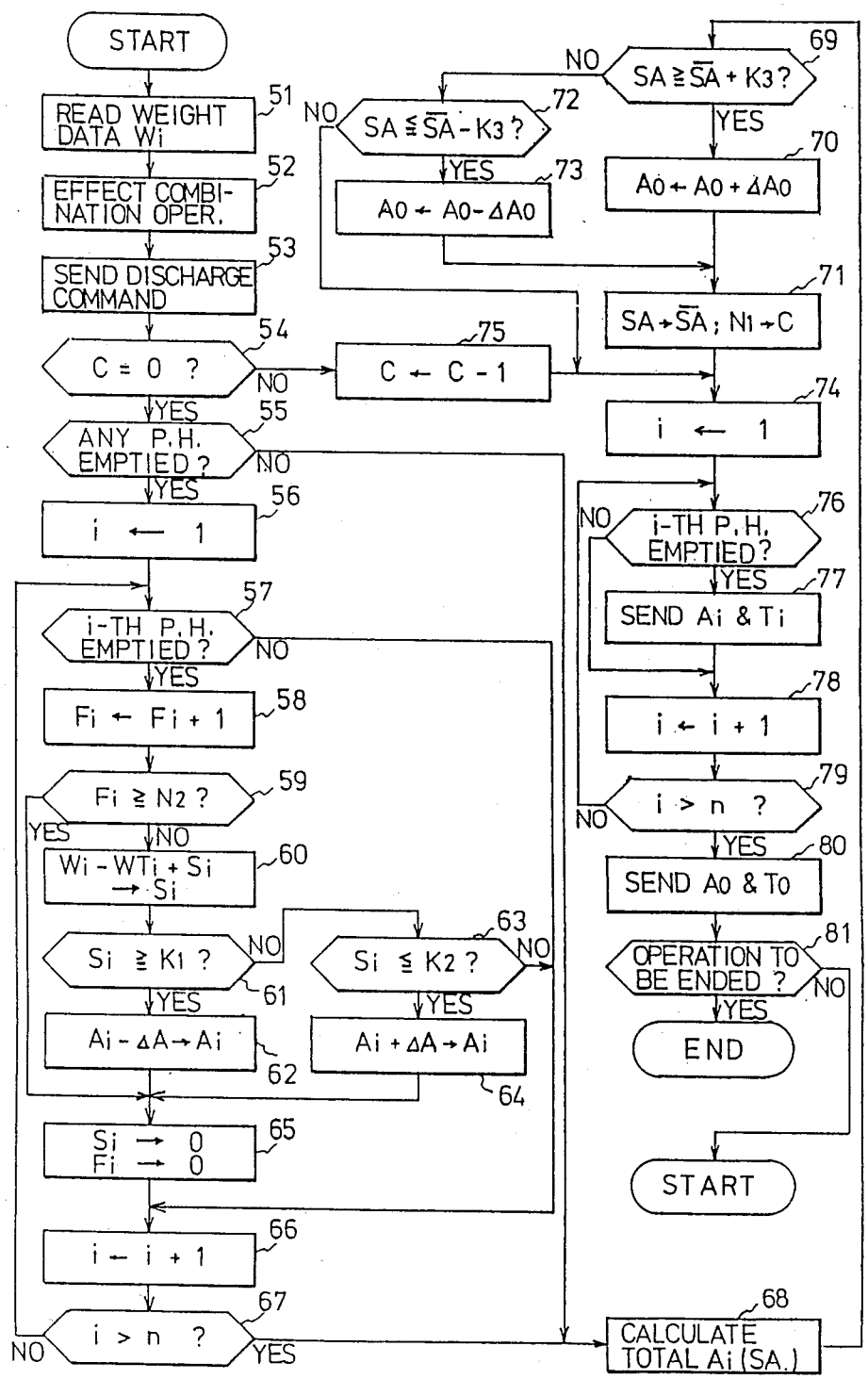
FIG. 4 is a flow chart representing a program executed in the microcomputer of FIG. 2 according to the invention

Now, the operation of the microcomputer 26 will be described below with reference to the flow chart of FIG. 4. It is assumed that the reference total weight R and respective weigher target weights $WT_i$ ($i=1, 2, ... n$) have been stored in the RAM of the microcomputer 26 through the keyboard unit 32 and all weigh hoppers $14_i$ and corresponding pool hoppers $10_i$ and linear feeders $6_i$ and the dispersion table 2 have been loaded with product. When the operation starts in this condition, the microcomputer 26 provides a control signal to the multiplexer 22 in step 51 to read the weight data $W_i$ from the load cells $16_i$ sequentially through the A/D converter 24 and stores them in digital form in predetermined locations of the RAM. Thereafter, a combination selecting operation is effected in step 52 using the stored weight data $W_i$.

In this embodiment, the prior art operation which has been effected by such hardware as n-bit binary counter, adder and comparator and is realized by employing software of the microcomputer 26. More particularly, the microcomputer 26 initially stores in its read-only memory (ROM) $2^n-1$ operation codes corresponding to all mathematical combinations of n-number of weight data $W_i$. Each operation code is a n-bit binary code in which i-th bit corresponds to $W_i$. In step 52, these operation codes are sequentially read out from the ROM and the weight data $W_i$ corresponding to logic "1" bits of the respective codes are summed individually to obtain $2_n-1$ combined sums. These combined sums are sequentially compared with the content of a maximum storage location of the RAM (the initial content being a preset allowable maximum of the combined sum) and the stored reference total weight R and, if the combined sum is between these values, the maximum value is updated with that combined sum and the corresponding code is stored in a code storage location of the RAM in place of the prior content. This operation is repeated for all operation codes. Thus, when the operation completed, the code storage location will store a code which provides an optimum combination having a combined sum weight equal or nearest to the reference total weight R and lower than the allowable maximum value.

In the next step 53, the microcomputer 26 provides the gate control device 28 with this finally stored optimum code as a discharge command to cause the gate control device to drive the gates $18_i$ of those weigh hoppers $14_i$ corresponding to the weight data $W_i$ included in the optimum combination to discharge their contents into the collection chute 20 and, thereafter, to drive the gates $12_i$ of the corresponding pool hoppers $10_i$ to reload the emptied weigh hoppers $14_i$ with their contents.

Before continuing the description, it should be noted that the microcomputer 26 further includes the following: a counter for specifying each weight data $W_i$ (and corresponding weight hopper $14_i$, pool hopper $10_i$, linear feeder $6_i$ and the like) by its count "i" (hereinunder referred to as "i-counter"); a down-counter for counting the number of combination selecting operations effected after changing the amount of feed to the dispersion table 2 (hereinunder referred to as "c-counter"); n-number of counters for counting the number, $F_i$, of feeds of product to each pool hopper $10_i$ from corresponding linear feeder $6_i$ (hereinunder referred to as "$F_i$-counter") and n-number of accumulators having a content given by $S_i$ for accumulating the deviation of each weight data $W_i$ from the corresponding target weight $WT_i$ every cycle of operation (hereinunder referred to as "$S_i$-accumulator").

Step 54 determines whether the count "C" of the C-counter is zero or not. As described later, the C-counter is set to a predetermined number $N_1$ in step 71 and decremented by one in step 75. When the count "C" reaches zero, the linear feeder control program consisting of steps 55 to 67 and/or the dispersion table control program consisting of steps 68 to 73 are executed.

Step 55 determines whether there is any empty pool hopper or not. This judgement may be effected by checking the stored optimum combination code. More particularly, each logic "1" bit of the code indicates that the corresponding pool hopper is empty. If the answer to step 55 is NO, that is, if there is no empty pool hopper, the program jumps to step 68 and no linear feeder control operation is effected.

If the answer to step 55 is YES, the count of i-counter is set to one in step 56 and step 57 determines whether the pool hopper $10_1$ is empty or not. If it is empty the $F_i$-counter is incremented by one in step 58 and then compared with a predetermined number $N_2$ in step 59 whether it is greater than the latter or not. If not, the deviation of the current weight data $W_1$ from the target weight $WT_1$ is added to the current content $S_1$ of the $S_1$-accumulator in step 60 and the resultant sum is compared in step 61 or 63 with a predetermined upper or lower threshold $K_1$ or $K_2$. If the sum has exceeded the upper or lower threshold, the current amplitude specifying data $A_1$ is reduced or increased in step 62 or 64 by a predetermined correction value $\Delta A$. Thereafter, the contents of $S_1$-accumulator and $F_1$-counter are reset to zero in step 65. Step 65 is also carried out in the case when the answer in step 59 is YES. This means that the range between both thresholds $K_1$ and $K_2$ defines a range exempt from steps 62, 64 and 65. The accumulation of deviation $(W_i - WT_i)$ is begun again by step 57 when the accumulated sum $S_i$ falls outside of this range before the count $F_i$ reaches the number $N_2$. This exempt region prevents hunting of the vibration amplitude of the linear feeders. As an example, $N_2 = 30$, $K_1 = +10$ grams and $K_2 = -10$ grams.

If the answer in step 57 or 63 is NO, the i-counter is incremented by one in step 66 and the result is compared in step 67 with the number "n". Threafter, the same operation is repeated until the count "i" exceeds the number "n" and, when YES is obtained in step 67, the amplitude specifying data for those linear feeders corresponding to all empty pool hoppers have been corrected and renewed. When the answer in step 67 is YES or the answer in step 55 is NO, the dispersion feeder control program is commenced at step 68.

In step 68, the current amplitude specifying data $A_i$ are summed to obtain a total value SA and this value is compared in step 69 with the similar value $\overline{SA}$ used in the preceding operation. More particularly, step 69 determines whether the total value SA has increased more than a predetermined amount $K_3$ above the preceding value $\overline{SA}$ or not. If YES, the current dispersion table amplitude specifying data $A_0$ is increased by a predetermined correction amount $\Delta A_0$ in step 70. If the answer in step 69 is NO, step 72 determines whether the total value SA has been reduced more than $K_3$ below the preceding value $\overline{SA}$ or not. If YES, the amplitude specifying data $A_0$ is reduced by $\Delta A_0$ in step 73. After correction of the amplitude specifying data $A_0$, the current total value SA is stored as $\overline{SA}$ for future use and the C-counter is set to $N_1$ in step 71. Then, the i-counter is reset to one in step 74 and this is also the case when the answer in step 72 is NO.

When the answer in step 54 is NO, the count "C" is decremented by one in step 75 and followed by step 74. This means that neither the linear feeder control program nor the dispersion table control program is effected until the C-counter returns to zero after correcting the amplitude specifying data $A_0$ for the dispersion table. The reason is that the weighing operation must be performed several times after this correction in order to reflect the correction. The value of $N_1$ may be five, for example.

In the following steps 76 to 79, the corrected amplitude specifying data $A_i$ and the predetermined time specifying data $T_i$ for the linear feeders are supplied to the feeder control device 30 to confirm emptiness of the corresponding pool hoppers and to increment the count "i" by one in step 78 until the count exceeds "n" in step 79. Thereafter, the corrected amplitude specifying data $A_0$ and the predetermined time specifying data $T_0$ for the dispersion table are supplied in step 80 and step 81 determines whether the operation of this combination weighing machine is to be ended or not. If the answer is YES, the program is ended and, if NO, it is returned to "START". Thus, the emptied pool hoppers are fed with product at corrected vibration amplitudes.

Figure 5:
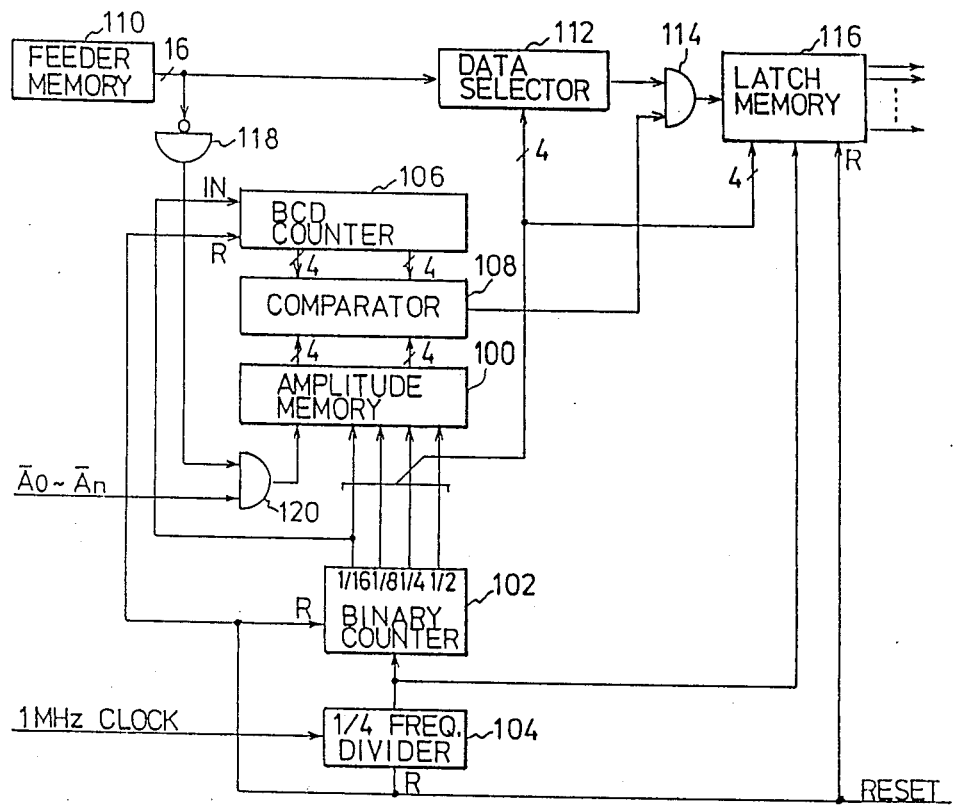
FIG. 5 is a block diagram representing another embodiment of the feeder control device according to the invention.

FIG. 5 shows an another embodiment of the circuit controlled by the microcomputer 26 of FIG. 2 for driving the thyristors $42_i$ (i=0, 1, 2, ... n) of FIG. 3. The circuit includes an amplitude data memory 100 having n+1 memory locations in which complements $\overline{A}_i$ of the amplitude specifying data $A_i$ (i=0, 1, 2, ... n) with respect to 99 are set by the microcomputer 26. These complements are sequentially read out in accordance with the count of a four-bit binary counter 102. The binary counter 102 is adapted to count a 250 KHz clock signals obtained for example by frequency-dividing a 1 MHz cock signal in a ¼ frequency divider 104. Accordngly, if n=15 for example, it takes 64 microseconds $(=(1/1,000,000) \times 4 \times 16$ second) to read out all complements from the amplitude data memory 100.

Figure 6:
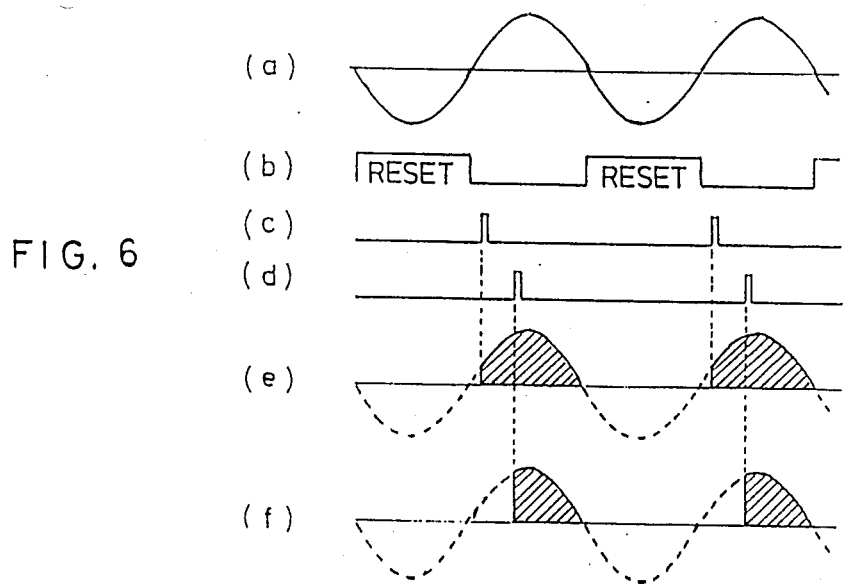
FIGS. 6(a) to 6(f) are timing diagrams illustrating varying waveforms of the feeder control device of FIG. 5.

The signal at the 1/16 frequency division terminal of the binary counter 102 is counted by a binary-coded decimal (BCD) counter 106. In the above example, therefore, the count of the BCD counter 106 is incremented by one every 64 microseconds. In other words, the count rises every time all complements in the amplitude data memory 68 are read out. The count of the BCD counter 106 is compared with each complement $\overline{A}_i$ from the amplitude data memory 100 by a comparator 108. In the above example, the count of the BCD counter is delivered every $4 \times 16/1,000,000$ second, while the amplitude data memory 100 is read every $4/1,000,000$ second. Therefore, each count of the BCD counter 106 is compared with all complements $\overline{A}_i$ (i=0, 1, 2, ... 15). The comparator 108 provides logic "1" when the applied complement coincides with the count. The binary counter 102, BCD counter 106 and ¼ frequency divider 104 are reset by a reset signal as shown in FIG. 6(b) obtained by negative half-wave rectification of commercial a.c. voltage as shown in FIG. 6(a). Accordingly, each count of the BCD counter 106 is compared with all complements $\overline{A}_i$ from the amplitude data memory 100 every 64 microseconds after the positive half-wave starts in the commercial a.c. voltage.

Accordingly, if the "1" output of comparator 108 is applied to the thyristor 42 corresponding to the applied complement, this thyrister is triggered at a time of $64 \times \overline{A}_i$ microseconds after the positive half-wave starts (strictly speaking, some deviation occurs in this time point in accordance with the memory address of each complement) as shown in FIGS. 6(c) and 6(d), thereby enabling control of power supplied to the vibrators $8_i$ of the dispersion table and linear feeders as shown by shadowed areas in FIGS. 6(e) and 6(f) and consequent control of vibration amplitudes thereof.

In this condition, however, the vibrators will continue operation so long as the commercial power is supplied thereto. In order to confine the operation time of each vibrator, a feeder memory 110 having n+1 memory locations corresponding to the dispersion table and n-number of linear feeders is adapted by the microcomputer 26 to produce a logic "1" output from each location for a time duration specified by the corresponding time specifying data $T_i$. The n+1 (16 in the above example) outputs of the feeder memory 110 are coupled to a data selector 112 which also receives the count output of the binary counter 102 are directs only the outut of feeder memory 110 from the memory location specified by the input count to an AND circuit 114. The AND circuit 114 also receives the output of comparator 108 at its second input and, therefore, supplies it to a latch memory 116 for the corresponding specified duration of time. The latch memory 116 having n+1 (16 in this example) memory locations respectively corresponding to those of the feeder memory 110 and being coupled to the gate electrodes of the corresponding thyristors $42_i$. The latch memory 116 is adapted to latch the current output of AND circuit 114 in its memory location specified by the count from the binary counter 102. Thus, the latch memory 116 can provide trigger pulses as shown in FIGS. 6(c) and 6(d) to specified thyristors for specified times. The output clock of the frequency divider 104 is used as a latch signal. The latch memory is also reset for the negative half-wave period of the commercial a.c. power by the reset signal of FIG. 6(b). Two AND circuits 118 and 120 are provided for rewriting the data stored in the amplitude data memory 100 only when no feeder is selected (or there is no empty pool hopper).

It should be noted that the above description has been made only for illustration purpose but not for limitation of the invention and many modifications and variations can be made within the scope of this invention as defined in the appended claims. For example, the vibration time may be controlled with the amplitude unchanged, while the amplitude is controlled in the above embodiments. The control of the dispersion table may be omitted if possible. This invention can be applied to other types of product feeders other than vibration feeders, such as of belt conveyer type. Moreover, this invention is applicable to any type of combination weighing machine, even machines having no pool hopper, regardless of its mechanical and electrical configuration and mode of combination selecting operation.

I claim:

1. In a combination weighing machine comprising a plurality of weighers for weighing product respectively to provide corresponding weight data, and means for selecting an optimum combination of said weight data which satisfies a predetermined condition and unloading those weighers corresponding to said optimum combination for delivery; a product feeding device comprising:

a plurality of product feeders for feeding product respectively to said weighers, each feeder being adapted to feed product to one of the weighers; feed control means for individually controlling the amounts of product fed to each of said weighers by said feeders based upon feed control data respectively provided for each of said weighers, and means for providing said feed control means with said feed control data and for controlling those feeders corresponding to the unloaded weighers, the data corresponding to deviations of the weight of product in each of said weighers as compared to respective target weight data for each of said weighers thereby to control the amount of product delivered by each of said feeders to its corresponding unloaded weigher.

2. A product feeding device as set forth in claim 1, characterized in that said means for providing said feed control means with said feed control data comprises:

means for accumulating, during delivery of product by each of said feeders, the deviation of the weight data of each of the weighers from said corresponding target weight data, means for changing said feed control data provided to each feeder to reduce the amount of feed to be delivered by each feeder when the accumulated value of its corresponding weigher exceeds a first predetermined value, and means for changing said feed control data provided to each feeder to increase the amount of feed to be delivered by each feeder when the accumulated value of its corresponding weigher is less than a second predetermined value.

3. A product feeding device as set forth in claim 1 or 2, characterized in that said feed control means is adapted to control the amount of feed per unit time delivered by each said feeder based on the feed control data of said feeder.

4. A product feeding device as set forth in claim 3 characterized in that said feed control means is adapted to control a vibration amplitude of each said separate feeder based on the feed control data of said separate feeder.

5. A product feeding device as set forth in claim 1 or 2, characterized in that said feed control means is adapted to control the operation time of each said feeder based on the feed control data of said feeder.

6. In a combination weighing machine comprising a plurality of weighers for weighing product respectively to provide corresponding weight data, and means for selecting an optimum combination of said weight data which satisfies a predetermined condition and unloading those weighers corresponding to said optimum combination for delivery; a product feeding device comprising:

a plurality of separate product feeders for feeding product respectively to said weighers, a common product feeder for feeding product at a product feed rate to said separate product feeders, feed control means for individually controlling the amounts of product fed to each of said weighers based upon feed control data respectively provided for each of said separate weighers and for controlling the amount of product fed from said common feeder to said separate product feeders based upon a feed control data provided for said common feeder, means for providing said feed control means with said feed control data and for controlling said separate feeders corresponding to the unloaded weighers based upon the deviations of said weight data of said unloaded weighers from respective target weight data thereby to control the amount of product delivered by each of said separate feeders to its corresponding unloaded weigher, and means for comparing the sum of said feed control data for the separate feeders with first and second values functionally related to said feed control data as a result of a preceding adjustment of the product feed rate of said common feeder and for modifying, based on the comparison, said product feed rate thereby to control the amount of product delivered by said common feeder to said separate feeders.

7. A product feeding device as set forth in claim 6, characterized in that said means for providing said feed control means with said feed control data comprises:
means for accumulating, during delivery of said product by each of said separate feeders, the deviation of the weight data of each of the weighers from said corresponding target weight data, means for changing said feed control data provided to each separate feeder to reduce the amount of feed to be delivered by each separate feeder when the accumulated value of its corresponding weigher exceeds a first predetermined value, and means for changing said feed control data provided to each separate feeder to increase the amount of feed to be delivered by each separate feeder when the accumulated value of its corresponding weigher is less than a second predetermined value.

8. A product feeding device as set forth in claim 6 or 7, characterized in that said means for providing said feed control means with the feed control data for the common feeder comprises means for increasing said feed control data for the common feeder when the sum of said feed control data for the separate feeders is greater than said sum of feed control data for separate feeders as the result of preceding adjustment of said common feeder plus a third predetermined value, and means for reducing said feed control data for the common feeder when the sum of said feed control data for separate feeders is less than said sum of feed control data for separate feeders as the result of preceding adjustment of the common feeder minus said third predetermined value.

9. A product feeding device as set forth in claim 8, characterized in that said feed control means is adapted to control the amount of feed per unit time delivered by each said separate feeder based on the feed control data of said separate feeder.

10. A product feeding device as set forth in claim 9 characterized in that said feed control means is adapted to control a vibration amplitude of each said separate feeder based on the feed control data of said separate feeder.

11. A product feeding device as set forth in claim 8, characterized in that said feed control means is adapted to control the operation time of each said separate feeder based on the feed control data of said separate feeder.

12. A product feeding device as set forth in claim 8, characterized in that said feed control means is adapted to control the amount of feed per unit time of said common feeder based on the feed control data of said common feeder.

13. A product feeding device as set forth in claim 12 characterized in that said feed control means is adapted to control a vibration amplitude of said common feeder based on the feed control data of said common feeder.

14. A product feeding device as set forth in claim 8, characterized in that said feed control means is adapted to control the operation time of said common feeder based on the feed control data of said common feeder.

15. A product feeding device as set forth in claim 6 or 7, characterized in that said feed control means is adapted to control the amount of feed per unit time delivered by each said separate feeder based on the feed control data of said separate feeder.

16. A product feeding device as set forth in claim 15 characterized in that said feed control means is adapted to control a vibration amplitude of each said separate feeder based on the feed control data of said separate feeder.

17. A product feeding device as set forth in claim 15, characterized in that said feed control means is adapted to control the amount of feed per unit time of said common feeder based on the feed control data of said common feeder.

18. A product feeding device as set forth in claim 17 characterized in that said feed control means is adapted to control a vibration amplitude of said common feeder based on the feed control data of said common feeder.

19. A product feeding device as set forth in claim 15, characterized in that said feed control means is adapted to control the operation time of said common feeder based on the feed control data of said common feeder.

20. A product feeding device as set forth in claim 6 or 7, characterized in that said feed control means is adapted to control the operation time of each said separate feeder based on the feed control data of said separate feeder.

21. A product feeding device as set forth in claim 20, characterized in that said feed control means is adapted to control the amount of feed per unit time of said common feeder based on the feed control data of said common feeder.

22. A product feeding device as set forth in claim 21 characterized in that said feed control means is adapted to control a vibration amplitude of said common feeder based on the feed control data of said common feeder.

23. A product feeding device as set forth in claim 20, characterized in that said feed control means is adapted to control the operation time of said common feeder based on the feed control data of said common feeder.

24. A product feeding device as set forth in claim 6 or 7, characterized in that said feed control means is adapted to control the amount of feed per unit time delivered by said common feeder based on the feed control data of said common feeder.

25. A product feeding device as set forth in claim 24 characterized in that said feed control means is adapted to control a vibration amplitude of said common feeder based on the feed control data of said common feeder.

26. A product feeding device as set forth in claim 6 or 7, characterized in that said feed control means is adapted to control the operation time of said common feeder based on the feed control data for said common feeder.

27. In a combination weighing machine comprising a plurality of weighers for weighing product to provide corresponding weight data, and means for selecting an optimum combination of said weight data which satisfies a predetermined condition and unloading those weighers corresponding to said optimum combination for delivery; a product feeding device comprising:

means for feeding product to the weighers comprising a plurality of product feeders, each feeder being adapted to feed product to one of the weighers;

means associated with the weighers for providing feed control data representing the status of each weigher the data corresponding to the deviation between the weight of product in the weigher as compared to a target weight for the weigher; and feed control means responsive to the feed control data for controlling the amount of product delivered to each weigher by said means for feeding.

28. The device of claim 27 further comprising:

a common product feeder for feeding product at a product feed rate to the product feeders; and wherein said feed control means controls the amount of product delivered to the product feeders by said common feeder in response to the feed control data.

29. The device of claim 28 further comprising means for comparing the feed control data for all feeders with first and second values corresponding to a previous adjustment of the product feed rate and for modifying, based on the comparison, the product feed rate.

30. A product feeding device as set forth in claim 29, characterized in that said means for providing said feed control means with said feed control data comprises:

means for accumulating, during delivery of said product by each of said feeders, the deviation of the weight data of each of the weighers from said corresponding target weight data, means for changing said feed control data provided to each feeder to reduce the amount of feed to be delivered by the feeder when the accumulated value of its corresponding weigher exceeds a first predetermined value, and means for changing said feed control data provided to each feeder to increase the amount of feed to be delivered by the feeder when the accumulated value of its corresponding weigher is less than a second predetermined value.

31. A product feeding device as set forth in claim 30, characterized in that said feed control means is adapted to control the operation time of said common feeder responsive to the feed control data of said common feeder.

32. A product feeding device as set forth in claim 30, characterized in that said feed control means is adapted to control the amount of feed per unit time of said common feeder responsive to the feed control data of said common feeder.

33. A product feeding device as set forth in claim 32 characterized in that said feed control means is adapted to control a vibration amplitude of said common feeder responsive to the feed control data of said common feeder.

34. A product feeding device as set forth in claim 33, characterized in that said feed control means is adapted to control the operation time of said common feeder responsive to the feed control data of said common feeder.

35. A product feeding device as set forth in claim 34, characterized in that said feed control means is adapted to control the amount of feed per unit time delivered by each said feeder responsive to the feed control data of said feeder.

36. A product feeding device as set forth in claim 35, characterized in that said feed control means is adapted to control a vibration amplitude of each said feeder responsive to the feed control data of said feeder.

37. A product feeding device as set forth in claim 36, characterized in that said feed control means is adapted to control the operation time of each said feeder responsive to the feed control data of said feeder.

38. A product feeding device as set forth in claim 27, characterized in that said means for providing said feed control means with said feed control data comprises:

means for accumulating, during delivery of said product by each of said feeders, the deviation of the weight data of each of the weighers from said corresponding target weight data, means for changing said feed control data provided to each feeder to reduce the amount of feed to be delivered by the feeder when the accumulated value of its corresponding weigher exceeds a first predetermined value, and means for changing said feed control data provided to each feeder to increase the amount of feed to be delivered by the feeder when the accumulated value of its corresponding weigher is less than a second predetermined value.

39. A product feeding device as set forth in claim 38, characterized in that said feed control means is adapted to control the amount of feed per unit time delivered by each said feeder responsive to the feed control data of said feeder.

40. A product feeding device as set forth in claim 39, characterized in that said feed control means is adapted to control a vibration amplitude of each said feeder responsive to the feed control data of said feeder.

41. A product feeding device as set forth in claim 40, characterized in that said feed control means is adapted to control the operation time of each said feeder responsive to the feed control data of said feeder.

42. A product feeding device as set forth in claim 38, characterized in that said feed control means is adapted to control the operation time of each said feeder responsive to the feed control data of said feeder.

* * * * *